(12) United States Patent
Okada et al.

(10) Patent No.: US 11,505,177 B2
(45) Date of Patent: Nov. 22, 2022

(54) CONTROL APPARATUS FOR VEHICLE AND CONTROL METHOD FOR VEHICLE

(71) Applicant: SUBARU CORPORATION, Tokyo (JP)

(72) Inventors: Tomoyuki Okada, Tokyo (JP); Satoshi Yoshizawa, Tokyo (JP); Tsubasa Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 280 days.

(21) Appl. No.: 16/259,465

(22) Filed: Jan. 28, 2019

(65) Prior Publication Data

US 2019/0276009 A1 Sep. 12, 2019

(30) Foreign Application Priority Data

Mar. 7, 2018 (JP) .............................. JP2018-041222

(51) Int. Cl.
*B60W 30/045* (2012.01)
*B60W 40/068* (2012.01)
*B60W 40/13* (2012.01)
*B60W 40/114* (2012.01)

(52) U.S. Cl.
CPC ........ *B60W 30/045* (2013.01); *B60W 40/068* (2013.01); *B60W 40/114* (2013.01); *B60W 40/13* (2013.01); *B60W 2720/14* (2013.01)

(58) Field of Classification Search
CPC .. B60W 30/045; B60W 40/068; B60W 40/13; B60W 40/114; B60W 2720/14;
(Continued)

(56) References Cited

U.S. PATENT DOCUMENTS

2005/0090943 A1* 4/2005 Kogure ............... B60W 10/184
 701/1
2005/0222740 A1 10/2005 Inoue et al.
(Continued)

FOREIGN PATENT DOCUMENTS

JP H04-331336 A 11/1992
JP H10-318862 A 12/1998
(Continued)

OTHER PUBLICATIONS

Japanese Office Action for Application No. 2018-041222 dated Jul. 30, 2019.

*Primary Examiner* — Marthe Y Marc-Coleman
(74) *Attorney, Agent, or Firm* — Troutman Pepper Hamilton Sanders LLP

(57) ABSTRACT

A control apparatus for a vehicle includes: a target yaw rate calculator; a primary limit yaw rate calculator; a yaw rate comparator; a secondary limit yaw rate calculator; and a vertical load controller. The target yaw rate calculator calculates a target yaw rate of the vehicle. The primary limit yaw rate calculator calculates a primary limit yaw rate on a basis of a vertical load on a wheel. The yaw rate comparator compares the target yaw rate with the primary limit yaw rate. The secondary limit yaw rate calculator calculates a secondary limit yaw rate in a case where a distribution of the vertical load on the wheel is changed in a case where the target yaw rate exceeds the primary limit yaw rate. The vertical load controller changes the vertical load on a basis of the secondary limit yaw rate.

17 Claims, 6 Drawing Sheets

(58) Field of Classification Search
CPC .......... B60W 2520/14; B60W 2720/30; Y02T 10/72; Y02T 10/64; B60L 2240/22; B60L 15/2036; B60T 8/1755; B60T 8/17551; B60T 8/246; B60T 2240/06; B62D 6/001; G01G 19/025

See application file for complete search history.

(56) References Cited

U.S. PATENT DOCUMENTS

| | | | |
|---|---|---|---|
| 2006/0006615 A1* | 1/2006 | Mizuta ................ | B60W 30/045 280/5.508 |
| 2010/0077847 A1* | 4/2010 | Joe ..................... | B60W 40/101 73/146 |
| 2013/0151075 A1* | 6/2013 | Moshchuk ........... | B60G 17/015 701/38 |
| 2015/0329109 A1* | 11/2015 | Okumura ............ | B60W 30/045 701/41 |
| 2016/0375896 A1* | 12/2016 | Mateo Artieda ...... | B60T 8/1755 701/36 |
| 2018/0265119 A1* | 9/2018 | Ogawa .................... | F02D 29/02 |
| 2019/0217709 A1* | 7/2019 | Zhao .................... | B60T 13/662 |

FOREIGN PATENT DOCUMENTS

| | | | | |
|---|---|---|---|---|
| JP | H11-048736 A | 2/1999 | | |
| JP | 2005-306121 A | 11/2005 | | |
| JP | 2008-143259 A | 6/2008 | | |
| JP | 4277799 B2 | 6/2009 | | |
| JP | 2011-183826 A | 9/2011 | | |
| WO | WO-2012023162 A1 * | 2/2012 | .............. | B60L 3/108 |

\* cited by examiner

CONTROL APPARATUS FOR VEHICLE AND CONTROL METHOD FOR VEHICLE

CROSS-REFERENCE TO RELATED APPLICATIONS

The present application claims priority from Japanese Patent Application No. 2018-041222 filed on Mar. 7, 2018, the entire contents of which are hereby incorporated by reference.

BACKGROUND

1. Technical Field

The present invention relates to a control apparatus for a vehicle and a control method for a vehicle.

2. Related Art

Conventionally, for instance, Japanese Unexamined Patent Application Publication (JP-A) No. 2005-306121 has described a vehicle posture control apparatus that decides, on the basis of the amount of excess lateral force and the amount of excess braking force of a tire, the distribution between the amount of control performed by a steering system control apparatus and the amount of control performed by a traveling system control apparatus.

SUMMARY OF THE INVENTION

An aspect of the present invention provides a control apparatus for a vehicle. The control apparatus includes: a target yaw rate calculator configured to calculate a target yaw rate of the vehicle; a primary limit yaw rate calculator configured to calculate a primary limit yaw rate on a basis of a vertical load on a wheel; a yaw rate comparator configured to compare the target yaw rate with the primary limit yaw rate; a secondary limit yaw rate calculator configured to calculate a secondary limit yaw rate in a case where a distribution of the vertical load on the wheel is changed in a case where the target yaw rate exceeds the primary limit yaw rate; and a vertical load controller configured to change the vertical load on a basis of the secondary limit yaw rate.

Another aspect of the present invention provides a control method for a vehicle. The control method includes: calculating a target yaw rate of the vehicle; calculating a primary limit yaw rate on a basis of a vertical load on a wheel; comparing the target yaw rate with the primary limit yaw rate; calculating a secondary limit yaw rate in a case where a distribution of the vertical load on the wheel is changed in a case where the target yaw rate exceeds the primary limit yaw rate; and changing the vertical load on a basis of the secondary limit yaw rate.

Another aspect of the present invention provides a control apparatus for a vehicle, the control apparatus including circuitry. The circuitry is configured to calculate a target yaw rate of the vehicle, calculate a primary limit yaw rate on a basis of a vertical load on a wheel, compare the target yaw rate with the primary limit yaw rate, calculate a secondary limit yaw rate in a case where a distribution of the vertical load on the wheel is changed in a case where the target yaw rate exceeds the primary limit yaw rate, and change the vertical load on a basis of the secondary limit yaw rate.

DETAILED DESCRIPTION

Figure 1:
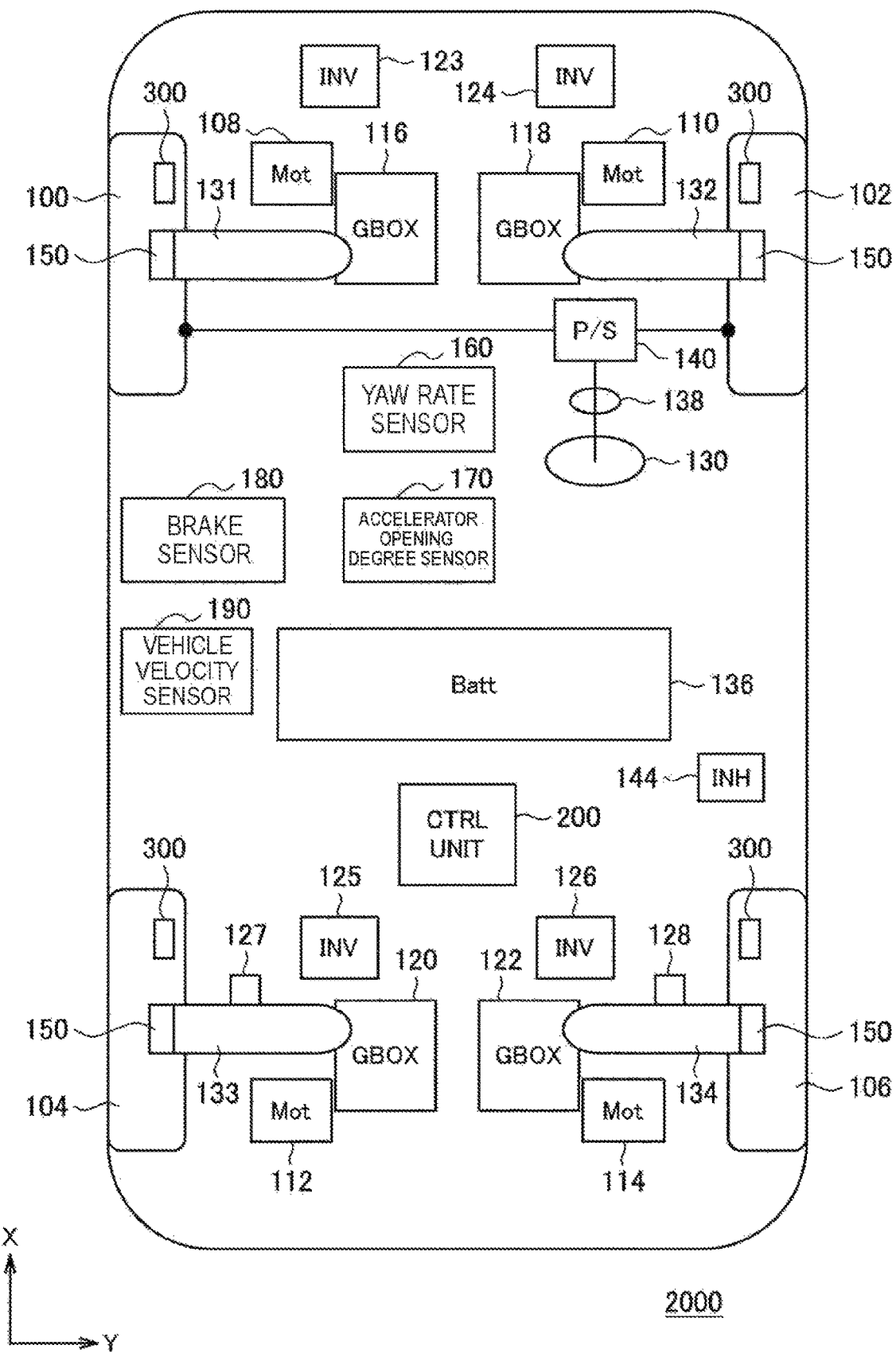
FIG. 1 is a schematic diagram illustrating a configuration of a vehicle according to an example of the present invention.

Hereinafter, preferred examples of the present invention will be described in detail with reference to the appended drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the appended drawings, structural elements that have substantially the same function and structure are denoted with the same reference numerals, and repeated description of these structural elements is omitted.

A driving situation of a vehicle changes every moment in accordance with traveling such as traveling around a curve, and traveling on an uphill road, a downhill road and the like. Therefore, it is desirable to optimally control the vehicle in accordance with a driving situation. However, the technology described in JP-A No. 2005-306121 decides the amount of control performed by a steering system control apparatus and the amount of control performed by a traveling system control apparatus within the ranges of the amount of excess lateral force and the amount of excess braking force, and it is not thus possible to drive a vehicle in a driving state in which the ranges of these amounts of excess force are exceeded.

It is desirable to provide a novel and improved control apparatus for a vehicle and a novel and improved control method for a vehicle which can optimally control a vertical load on a wheel on the basis of a target yaw rate of the vehicle and a limit yaw rate of the vehicle.

First, with reference to FIG. 1, the configuration of a vehicle 2000 according to an example of the present invention will be described. FIG. 1 is a schematic diagram illustrating the vehicle 2000 according to the present example. As illustrated in FIG. 1, the vehicle 2000 includes front wheels 100 and 102, rear wheels 104 and 106, braking and driving force generation apparatuses (motors) 108, 110, 112, and 114 that respectively drive the front wheels 100 and 102 and the rear wheels 104 and 106, gear boxes 116, 118, 120, and 122 and drive shafts 131, 132, 133, and 134 that respectively transmit the braking and driving force of the motors 108, 110, 112, and 114 to the front wheels 100 and 102 and the rear wheels 104 and 106, inverters 123, 124, 125, and 126 that respectively control the motors 108, 110, 112, and 114, wheel speed sensors 127 and 128 that respectively detect the wheel speed (vehicle velocity V) of the rear wheels 104 and 106, a steering wheel 130 for steering the front wheels 100 and 102, a battery 136, a steering angle sensor 138, a power steering mechanism 140, and a brake actuator 300.

In addition, the vehicle 2000 includes a hub unit sensor 150, a yaw rate sensor 160, an accelerator opening degree sensor 170, a brake sensor 180, a vehicle velocity sensor 190, and a control apparatus (controller) 200.

The vehicle 2000 according to the present example includes the motors 108, 110, 112, and 114 for driving the front wheels 100 and 102 and the rear wheels 104 and 106, respectively. Therefore, it is also possible to control braking and driving torque in each of the front wheels 100 and 102 and the rear wheels 104 and 106. Note that, in the case where the motors 108, 110, 112, and 114 are caused to generate braking force, braking force is generated by performing regenerative control of the motors 108, 110, 112, and 114.

The driving of the respective motors 108, 110, 112, and 114 is controlled by controlling the inverters 123, 124, 125, and 126 respectively corresponding to the motors 108, 110, 112, and 114 on the basis of commands of the control apparatus 200. The driving force of the respective motors 108, 110, 112, and 114 are respectively transmitted to the front wheels 100 and 102 and the rear wheels 104 and 106 via the respective gear boxes 116, 118, 120, and 122 and drive shafts 131, 132, 133, and 134.

The power steering mechanism 140 uses torque control or angle control in accordance with the steering wheel 130 operated by a driver to control the steering angle of the front wheels 100 and 102. The steering angle sensor 138 detects a steering wheel angle θh input by a driver operating the steering wheel 130.

The brake actuator 300 is an actuator that is included in each of the front wheels 100 and 102 and the rear wheels 104 and 106, and controls the braking force of each of the front wheels 100 and 102 and the rear wheels 104 and 106.

Note that the present example is not limited to this mode, but a vehicle in which the rear wheels 104 and 106 alone independently generate driving force may also be adopted.

As illustrated in FIG. 1, as a coordinate system of a vehicle, the advancing direction of the vehicle is defined as an x axis, and the left-right direction of the vehicle is defined as a y axis. In addition, the up-down direction of the vehicle is defined as a z axis. The x axis regards the acceleration direction of the vehicle as a positive direction, the y axis regards the right direction as a positive direction, and the z axis regards the up direction as a positive direction.

Figure 2:
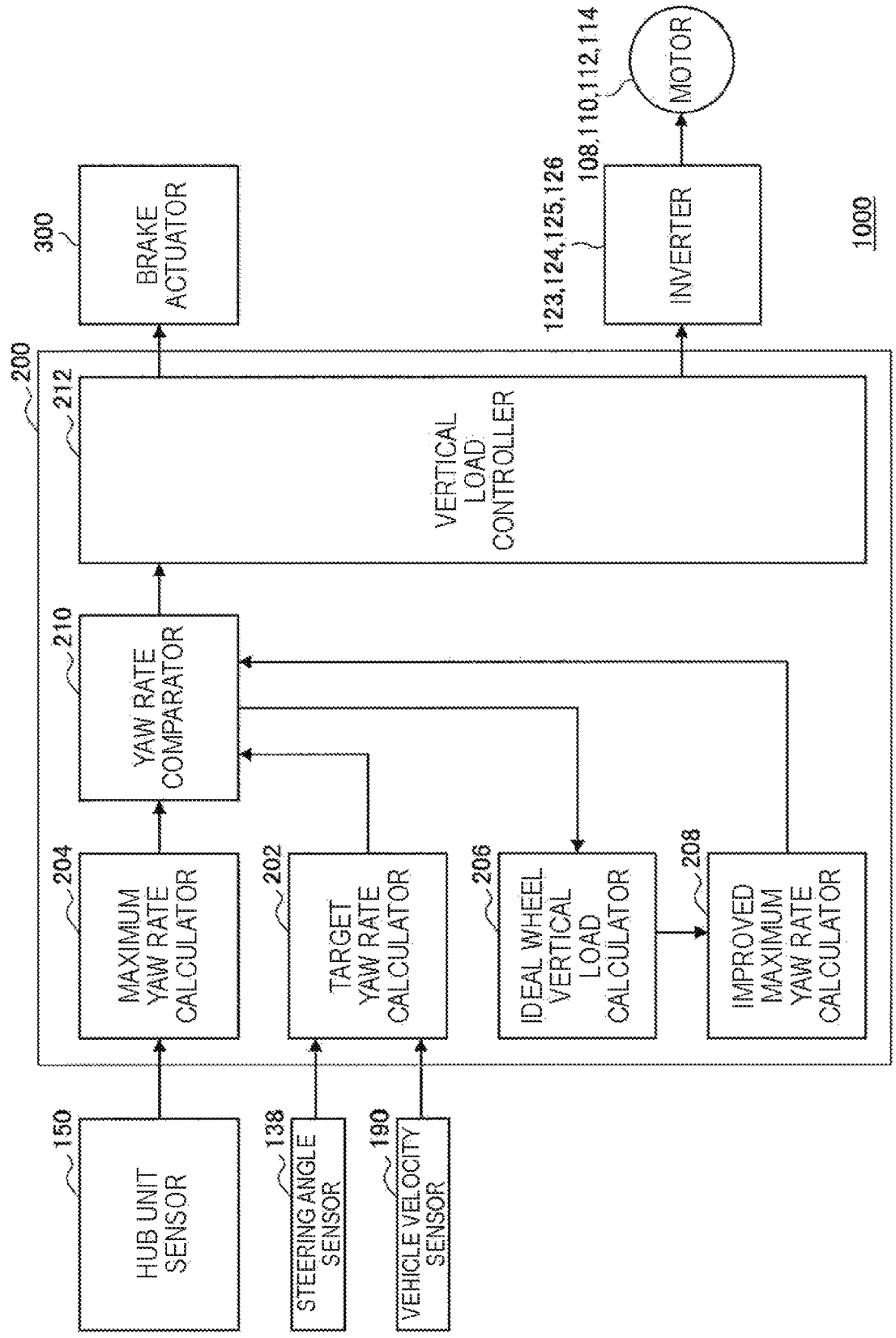
FIG. 2 is a schematic diagram for describing a configuration of a vehicle system according to the example of the present invention.

Next, with reference to FIG. 2, the configuration of a vehicle system 1000 according to the example of the present invention will be described. This vehicle system 1000 is installed in the vehicle 2000. As illustrated in FIG. 2, the vehicle system 1000 according to the present example includes the hub unit sensor 150, the steering angle sensor 138, the vehicle velocity sensor 190, the control apparatus 200, the brake actuator 300, the inverters 123, 124, 125 and 126, and the motors 108, 110, 112 and 114.

The control apparatus 200 controls the entire vehicle system 1000. The control apparatus 200 includes a target yaw rate calculator 202, a maximum yaw rate calculator (primary limit yaw rate calculator) 204, an ideal wheel vertical load calculator 206, an improved maximum yaw rate calculator (secondary limit yaw rate calculator) 208, a yaw rate comparator 210, and a vertical load controller 212. A component of the control apparatus 200 illustrated in FIG. 2 can include a circuit (hardware) or a central processing unit such as a CPU, and a program (software) for bringing it into operation.

The hub unit sensor 150 is provided to the hub of a wheel, and detects acting force that acts on the front wheels 100 and 102 and the rear wheels 104 and 106. The acting force detected by the hub unit sensor 150 has three-direction force components including the longitudinal force Fx, the lateral force Fy and the normal force Fz, and torque Ty around the shaft of a hub (axle). The longitudinal force Fx is a force component generated in the direction (x-axial direction or front-back direction) parallel to the wheel central plane in frictional force generated in the contact area between the front wheels 100 and 102 and the rear wheels 104 and 106, and the lateral force Fy is a force component generated in the direction (y-axial direction or lateral direction) at right angles to the wheel central plane. Note that the wheel central plane is taken to be a plane which is orthogonal to the axle, and passes through the center of the wheel width. Meanwhile, the normal force Fz is force that acts on the perpendicular direction (z axis) or a so-called vertical load. The torque Ty is torque (torsional force) around the axle of a tire 800.

For instance, the hub unit sensor 150 chiefly includes a strain gauge, and a signal processing circuit that processes an electrical signal output from this strain gauge and generates a detection signal corresponding to acting force. On the basis of the knowledge that stress generated in a hub is proportionate to acting force, the strain gauge is embedded in the hub to directly detect acting force. Note that, as the specific configuration of the hub unit sensor 150, for instance, the configurations described in JP-A H04-331336, JP-A H10-318862, Japanese Patent No. 4277799, and the like can be adopted. The hub unit sensors 150 may also be provided to the drive shafts 131, 132, 133, and 134.

In the present example, in the case where a tire force limit value (size of a friction circle) is not sufficient for a target yaw rate, a load imposed on a tire in the vertical direction is moved and the tire force limit value is controlled to enable a turn to be made at a desired yaw rate. The tire force limit value increases or decreases depending on a vertical load imposed on the tire. Therefore, the vertical load Fz imposed on the tire is controlled to make it possible to control the tire force limit value and achieve higher maneuverability.

When it is not possible to make a turn at the current target yaw rate with the current vehicle weight distribution and tire force limit value while the vehicle 2000 is traveling, the vertical loads Fz imposed on the tires of the front wheels 100 and 102 and the rear wheels 104 and 106 are controlled and the tire force limit value of each wheel to achieve the target yaw rate. The vertical load Fz is controlled with components such as the motors 108, 110, 112, and 114 and the brake actuator 300 that control vehicle longitudinal acceleration.

As the overview of the process performed by the control apparatus 200, the target yaw rate of the traveling vehicle 2000 is first obtained, and a primary limit yaw rate is calculated on the basis of a tire force limit value that is decided by the current vertical load on each wheel. Then, in the case where the target yaw rate exceeds the primary limit yaw rate, there is a possibility of failing to go around a curve. Accordingly, the load distribution of vertical loads is changed, a tire force limit value based on the ideal vertical load distribution of each wheel is estimated, and a secondary limit yaw rate is calculated.

Then, in the case where a comparison between the target yaw rate and the secondary limit yaw rate shows that the target yaw rate is less than or equal to the secondary limit yaw rate, the vehicle 2000 is decelerated and loads are distributed to the front wheels to achieve a turn at the target yaw rate.

Figure 3:
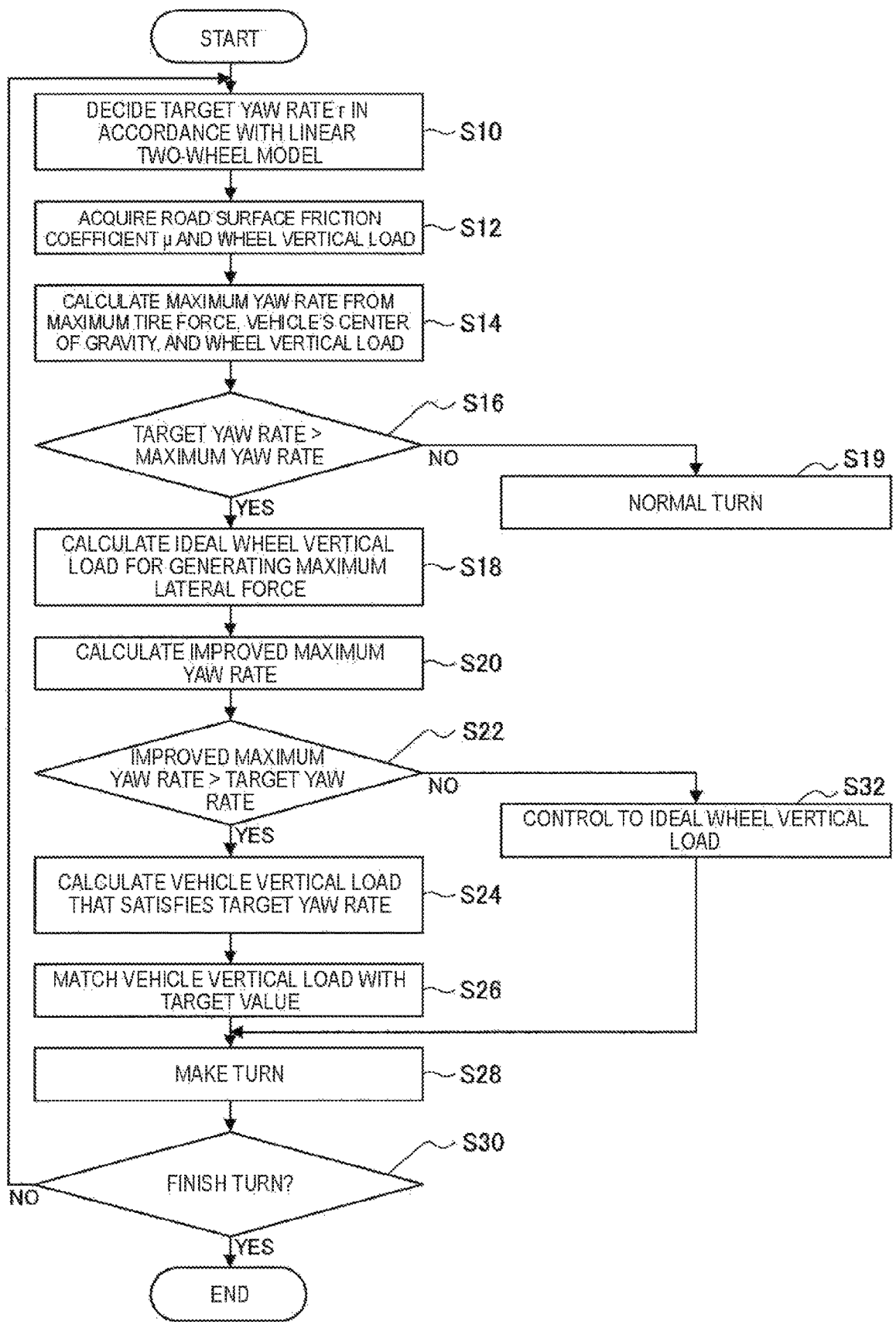
FIG. 3 is a flowchart illustrating a process performed in the vehicle system according to the present example.

FIG. 3 is a flowchart illustrating a process performed in the vehicle system 1000 according to the present example. The processes illustrated in FIG. 3 are performed by the control apparatus 200 in each predetermined cycle. First, in step S10, the target yaw rate decider 202 calculates a target yaw rate r of the vehicle 2000. The target yaw rate r can be calculated from the following expression (1) on the basis of a linear two-wheel model.

$$2(l_f K_f - l_r K_r)\beta + I\frac{dr}{dt} + \frac{2(l_f^2 K_f + l_r^2 K_r)}{V}r = 2l_f K_f \delta \quad (1)$$

However, in the expression (1), $l_f$ is the distance from the vehicle's center of gravity to the front wheels, lr is the distance from the vehicle's center of gravity to the rear wheels, $K_f$ is the cornering power of the front wheels, $K_r$ is the cornering power of the rear wheels, I is yaw inertia, r is a yaw rate (target yaw rate), β is a slip angle, V is vehicle velocity, and δ is a tire steering angle. For instance, the vehicle specifications such as the vehicle velocity V, the tire steering angle δ, $l_f$, $l_r$, $K_f$, and $K_r$ are substituted into the expression (1) to obtain the target yaw rate r. The tire steering angle δ can be obtained from the steering wheel angle θh acquired from the steering angle sensor 138 and the steering gear ratio.

Note that a target yaw rate does not have to be calculated in the method in which a target yaw rate is calculated from the expression (1), but, for instance, it is possible to adopt any technique such as recognizing the curvature of a lane in front of the vehicle from an image of a camera that images the area in front of the vehicle and calculating a target yaw rate in accordance with the curvature.

Next, in step S12, a current road surface friction coefficient μ and the wheel vertical load. Fz are acquired. As the road surface friction coefficient μ, a value set in advance can be used. In addition, the road surface friction coefficient μ may be acquired in any method such as estimating it on the basis of an image of a camera that images the road surface in front of the vehicle. As the wheel vertical load Fz, a detection value (normal force Fz) of the hub unit sensor 150 is acquired. The wheel vertical load Fz may also be acquired in any other method. Next, in step S14, the maximum yaw rate calculator 204 calculates the maximum yaw rate (primary limit yaw rate) of the vehicle in the current traveling state. Here, if the lateral direction acceleration is y″, the vehicle velocity is V, the slip angular velocity is β′, and the yaw rate is r, the relationship in the following expression (2) holds.

$$y''=V(\beta'+r) \quad (2)$$

If the vehicle weight is m, the following expression (3) is obtained from the expression (2).

$$Fy=mV(\beta'+r) \quad (3)$$

If the slip angular velocity β′≈0 in the expression (3), the relationship in the following expression (4) is obtained. The lateral force Fy in the expression (4) is obtained by multiplying the road surface friction coefficient μ acquired in the step S12 by the vertical load Fz. Thus, substituting the lateral force Fy, the vehicle velocity V, and the vehicle weight m into the expression (4) makes it possible to calculate the maximum yaw rate r.

$$Fy=mVr \quad (4)$$

Next, in step S16, the yaw rate comparator 210 compares the value of the maximum yaw rate with the value of the target yaw rate, and determines whether the target yaw rate>the maximum yaw rate. Then, in the case where the target yaw rate>the maximum yaw rate, the flow proceeds to step S18. Meanwhile, in the case where the target yaw rate≤the maximum yaw rate, the flow proceeds to step S19. A normal turn is made.

In the case where the flow proceeds to step S18, the target yaw rate exceeds the maximum yaw rate. Therefore, if a turn is made in this state, there is a possibility of failing to go around a curve. Then, in the processes subsequent to step S18, the vehicle is decelerated and the vertical load on a wheel is changed to control the size of a friction circle and achieve a desired turn. Meanwhile, in the case where the flow proceeds to step S19, the target yaw rate is less than or equal to the maximum yaw rate. Therefore, a normal turn is made without changing the vertical load.

Therefore, first in step S18, in the case where the vertical load is changed, an ideal wheel vertical load that generates the maximum lateral force under the condition of the current road surface friction coefficient μ is calculated. The ideal wheel vertical load is calculated by the ideal wheel vertical load calculator 206. Next, in step S20, the improved maximum yaw rate calculator 208 calculates an improved maximum yaw rate (secondary limit yaw rate) in the case where the vertical load is changed.

The following describes the processes of steps S18 and S20 in detail. As an instance, it is assumed that there is no steering wheel angle difference between left and right wheels and a slip angle is small, and a plane two-wheel model is used. Here, if the dependency of the friction coefficient μ on Fz for a certain road surface is known, Fz has a proportionate relationship with Fy/Fz. That is, the relationship of $Fy=a*Fz^2 b*Fz$ holds. Thus, Fy is a quadratic function of Fz, and Fy has a maximum value (extremum). This maximum value of Fy is defined as an improved maximum tire force.

As an instance, it is assumed that deceleration is generated only in the rear wheels 104 and 106, and the front wheels 100 and 102 are used for steering. That is, it is assumed that the longitudinal force Fx in deceleration is generated in the rear wheels 104 and 106, and the lateral force Fy for turning is generated in the front wheels 100 and 102. Thus, the longitudinal force Fx of the front wheels 100 and 102 and the lateral force Fy of the rear wheels 104 and 106 are zero. In addition, with respect to the three force components of each wheel that can be acquired from the hub unit sensor 150, the force of the x component and the force of the y component of a front wheel or a rear wheel are each equal to the sum of the two left and right wheels.

Figure 4:
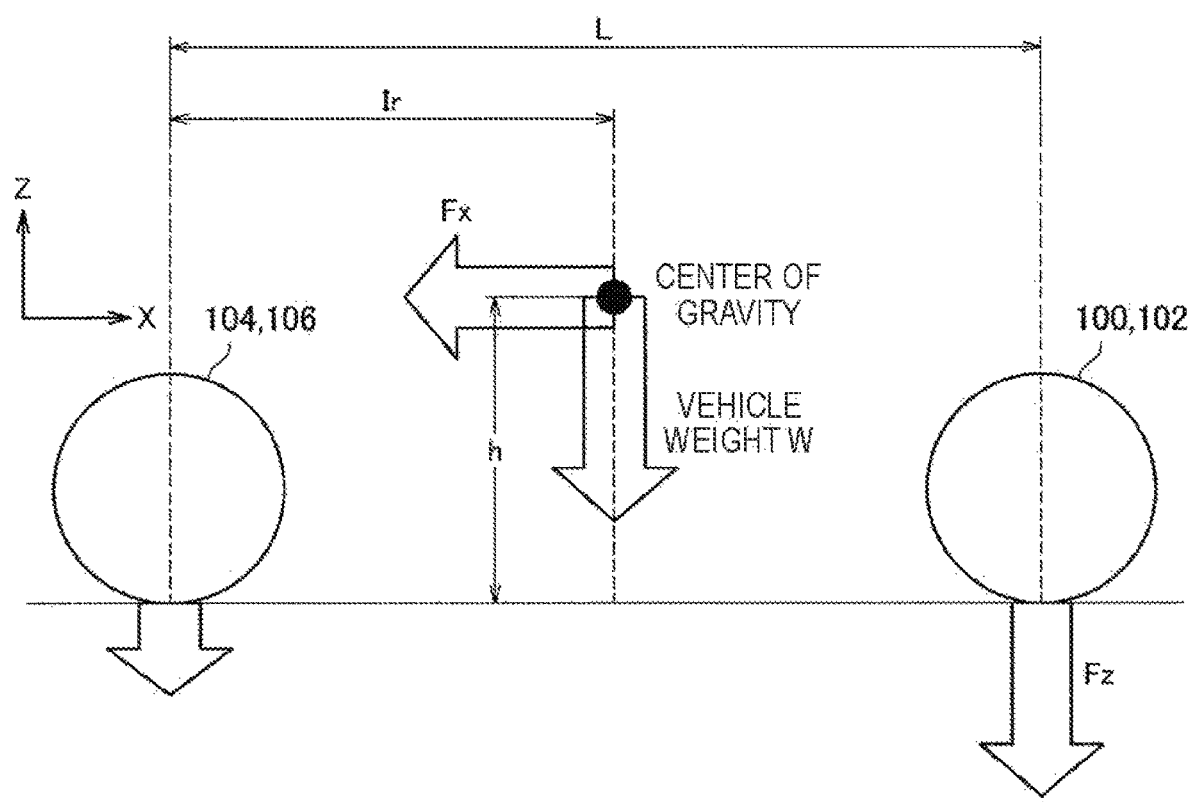
FIG. 4 is a schematic diagram illustrating moment balance around a rear wheel.

It is assumed that decelerating the vehicle 2000 generates the force Fx in the front-back direction in the vehicle's center of gravity. As illustrated in FIG. 4, taking into consideration the moment balance around the rear wheels 104 and 106, the vertical loads Fz on the front wheels 100 and 102 at the time at which the force Fx in the front-back direction which is caused by the deceleration is added can be expressed with the following expression (5).

$$F_z = mg\frac{l_r}{L} - \frac{h}{L}F_x \quad (5)$$

However, in the expression (5), mg is vehicle weight [N], $l_r$ is the distance from the vehicle's center of gravity to the rear wheels, L is a wheel base, and h is the height of the vehicle's center of gravity.

Figure 5:
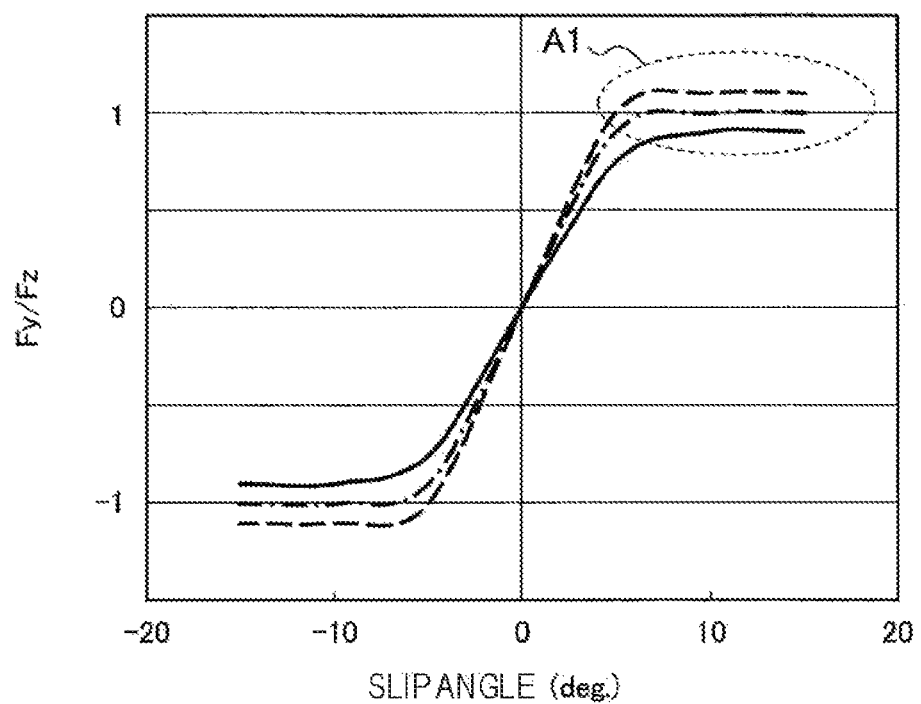
FIG. 5 is a characteristic diagram illustrating that a proportion (=Fy/Fz) of lateral force Fy to a vertical load Fz changes in accordance with a slip angle.

FIG. 5 is a characteristic diagram illustrating that the proportion (=Fy/Fz) of the lateral force Fy to the vertical load Fz changes in accordance with a slip angle. As characteristics of the solid line, the one-dot chain line, and the dashed line illustrated in FIG. 5, three characteristics with different values for the vertical loads Fz are illustrated, and the values of the vertical loads Fz decrease in the order from the characteristic of the solid line, the characteristic of the one-dot chain line, and the characteristic of the dashed line. As an instance, in the characteristic of the solid line, Fz is equal to 7000 [N]. In the characteristic of the one-dot chain line, Fz is equal to 4500 [N]. In the characteristic of the dashed line, Fz is equal to 2000 [N]. Note that, as the characteristics illustrated in FIG. 5, characteristics depending on the states of a tire and a road surface are illustrated and can be acquired from an experiment.

As illustrated in FIG. 5, once a slip angle becomes greater than or equal to a certain level (area A1 illustrated in FIG. 5), the value of Fy/Fz is saturated. In the example illustrated in FIG. 5, it is understood that, in the area A1, the lateral force Fy equivalent to the vertical load Fz is generated. Thus, making a turn in an area A allows the maximum friction coefficient to be exhibited, and allows the lateral force Fy to be maximally increased. Accordingly, it is possible to efficiently increase the maximum yaw rate. In step S20, an improved maximum yaw rate is obtained on the basis of this characteristic.

Figure 6:
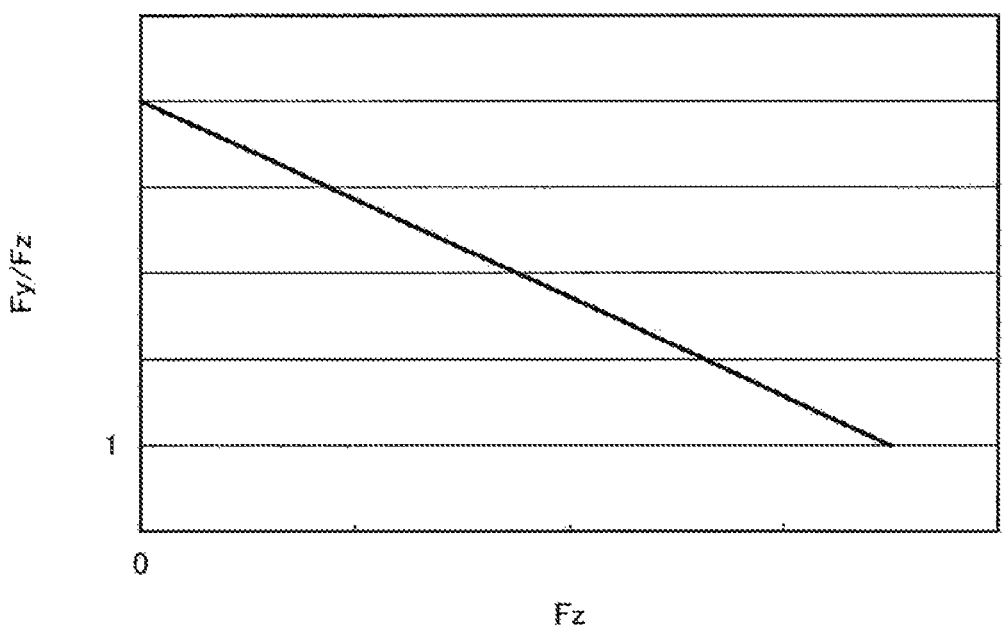
FIG. 6 is a characteristic diagram illustrating a relationship between the vertical load Fz and Fy/Fz.

As illustrated in FIG. 5, in the area A, the smaller vertical load Fz causes Fy/Fz to have a larger value. FIG. 6 is a characteristic diagram illustrating the relationship between the vertical load Fz and Fy/Fz in the area A. As illustrated in FIG. 6, the vertical load Fz has a linear relationship with Fy/Fz. The characteristics illustrated in FIG. 6 are stored in advance in a memory or the like included in the control apparatus 200, and used when an ideal wheel vertical load and a maximum yaw rate are calculated. Note that the characteristics illustrated in FIG. 6 illustrate characteristics depending on parameters indicating the states of a tire and a road surface, so that the control apparatus 200 may store the characteristics corresponding to these parameters and use a characteristic selected in accordance with a driving situation when calculating an ideal wheel vertical load and a maximum yaw rate.

Linearly approximating the relationship illustrated in FIG. 6, and setting $P_k$ as a proportional coefficient and $P_{lc0}$ as an intercept offer the following expression (6). It is assumed that $P_{lc}>0$ holds in the expression (6).

$$\frac{F_y}{F_z} = -p_{lc}F_z + p_{lc0} \quad (6)$$

As clearly demonstrated from the expression (6), the lateral force Fy can be regarded as a quadratic equation of the vertical load Fz, and serves as a convex upward function.

The condition that Fy monotonically increases can be expressed with the following expression (7). In addition, when the left side of the expression (7) is 0, the lateral force Fy has the maximum value.

$$-2p_{lc}F_z + p_{lc0} > 0 \quad (7)$$

Thus, in step S18, the vertical load Fz at the time at which the left side of the expression (7) is 0 is calculated as an ideal wheel vertical load for generating the maximum lateral force. In addition, in step S20, the ideal wheel vertical load is substituted into Fz of the expression (6) to calculate the maximum tire lateral force, and the expression (4) is used for transform to a yaw rate to calculate an improved maximum yaw rate.

In addition, the relationship between Fz and Fx has been already obtained in the expression (5). Therefore, if the expression (5) is substituted into the expression (7), the following expression (8) is obtained, and it is possible to obtain the longitudinal force Fx at the time at which the lateral force Fy has the maximum value. Specifically, the lateral force Fy monotonically increases when the expression (8) is satisfied. If Fx satisfying the following expression (9) is imparted to the decelerating vehicle 2000, the lateral force Fy has the maximum value.

$$\frac{mgl_r}{L} - \frac{p_{lc0}}{p_{lc}} < \frac{h}{L}Fx \quad (8)$$

$$\frac{mgl_r}{L} - \frac{p_{lc0}}{p_{lc}} = \frac{h}{L}Fx \quad (9)$$

In addition, the maximum value of Fx is defined with the maximum tire force, and it is not possible to impart braking force exceeding the maximum tire force. Therefore, Fy defined with any of the longitudinal force Fx obtained from the expression (9) and the maximum tire force in the front-back direction that is smaller is set as the maximum lateral force.

Thus, in the case where the maximum yaw rate in step S16 exceeds the target yaw rate, the vehicle 2000 is decelerated and the vertical load is distributed to the front wheel side to permit the target yaw rate of the vehicle 2000 up to the improved maximum yaw rate. In other words, if the target yaw rate is less than or equal to the improved maximum yaw rate, it is possible to make a turn at the target yaw rate.

Therefore, next, in step S22, the yaw rate comparator 210 compares the improved maximum yaw rate with the target yaw rate, and determines whether the improved maximum yaw rate>the target yaw rate. Then, in the case where the improved maximum yaw rate>the target yaw rate, the flow proceeds to step S24.

In the case where the flow proceeds to step S24, the target yaw rate is smaller than the improved maximum yaw rate, and thus deceleration causes the vertical load to be distributed to the front wheel side to make it possible to make a turn at the target yaw rate. In contrast, if the vehicle is decelerated until entering the state in which the improved maximum yaw rate can be exhibited in the case where the improved maximum yaw rate is sufficiently greater than the target yaw rate, the deceleration is excessive with respect to the target yaw rate.

Thus, in step S24, the vertical load controller 212 calculates a vertical load necessary and sufficient to satisfy the target yaw rate. The target yaw rate is calculated in step S10, and thus the lateral force Fy corresponding to the target yaw rate is obtained from the expression (4) indicating the relationship between the yaw rate r and the lateral force Fy. The vertical load Fz for generating the lateral force Fy corresponding to the target yaw rate, that is, the target value of the vertical load Fz for making a turn at the target yaw rate is obtained from the expression (6) indicating a linear approximation formula of the maximum tire force.

Once Fz for making a turn at the target yaw rate is obtained, it is possible to obtain the target value of the longitudinal force Fx necessary for deceleration from the above-mentioned expression (5) indicating the moment balance regarding the vehicle.

In step S26, the vertical load controller 212 controls the motors 112 and 114, and the brake actuator 300 of the rear wheels 104 and 106, and performs control such that the vertical loads Fz of the front wheels 100 and 102 obtained from the hub unit sensor 150 agree with the target value for making a turn at the target yaw rate. In addition, the vertical load controller 212 controls the motors 112 and 114, and the brake actuator 300 of the rear wheels 104 and 106 such that the longitudinal force Fx of the rear wheels 104 and 106 obtained from the hub unit sensor 150 agrees with the target value.

Next, in step S28, the vehicle 2000 is turned with the vertical load Fz controlled as the target value. Next, in step S30, it is determined whether the turn is finished. In the case where the turn is finished, the process is terminated. In contrast, in the case where the turn is not finished, the flow returns to step S10, and the subsequent processes are performed again.

In addition, in the case where the improved maximum yaw rate≤the target yaw rate in step S22, the flow proceeds to step S32. In the case where the flow proceeds to step S32, the target yaw rate is greater than or equal to the improved maximum yaw rate, and thus the vertical load Fz is controlled as the ideal wheel vertical load in order to make a turn at the improved maximum yaw rate.

In step S32, the vertical load controller 212 controls the motors 112 and 114, and the brake actuator 300 of the rear wheels 104 and 106, and performs control such that the vertical loads Fz of the front wheels 100 and 102 agree with the ideal wheel vertical load. In addition, control may be performed on the basis of the longitudinal force Fx obtained by substituting the ideal wheel vertical load obtained in step S18 into Fz of the expression (5). In addition, the vertical load controller 212 controls the motors 112 and 114, and the brake actuator 300 of the rear wheels 104 and 106 such that the longitudinal force Fx of the rear wheels 104 and 106 obtained from the hub unit sensor 150 agrees with the longitudinal force Fx obtained from the ideal wheel vertical load. Accordingly, it is possible to make a turn at the maximum yaw rate that is the closest to the target yaw rate.

According to the processes described above, for instance, in the case where the vehicle 2000 enters a curve from a straight road, the case where a driver further turns the steering wheel 130 while the vehicle 2000 is going around a curve, or the like, the target yaw rate is calculated with the vehicle velocity V and the steering angle of the steering wheel 130. Then, the vertical load is controlled in accordance with a comparison between the target yaw rate and the maximum yaw rate, and a comparison between the target yaw rate and the improved maximum yaw rate. This enables the vehicle 2000 to surely make a turn.

Figure 7:
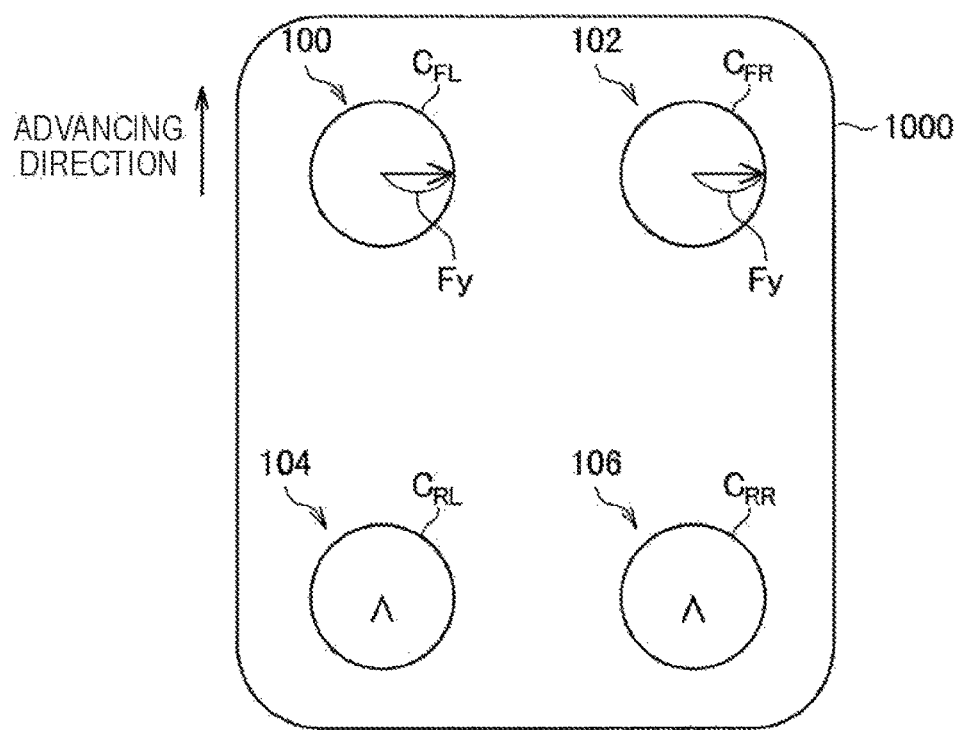
FIG. 7 is a schematic diagram for describing that a vehicle is decelerated and more vertical loads Fz are distributed to a front wheel side, thereby changing friction circles of a front wheel and a rear wheel in size.
Figure 8:
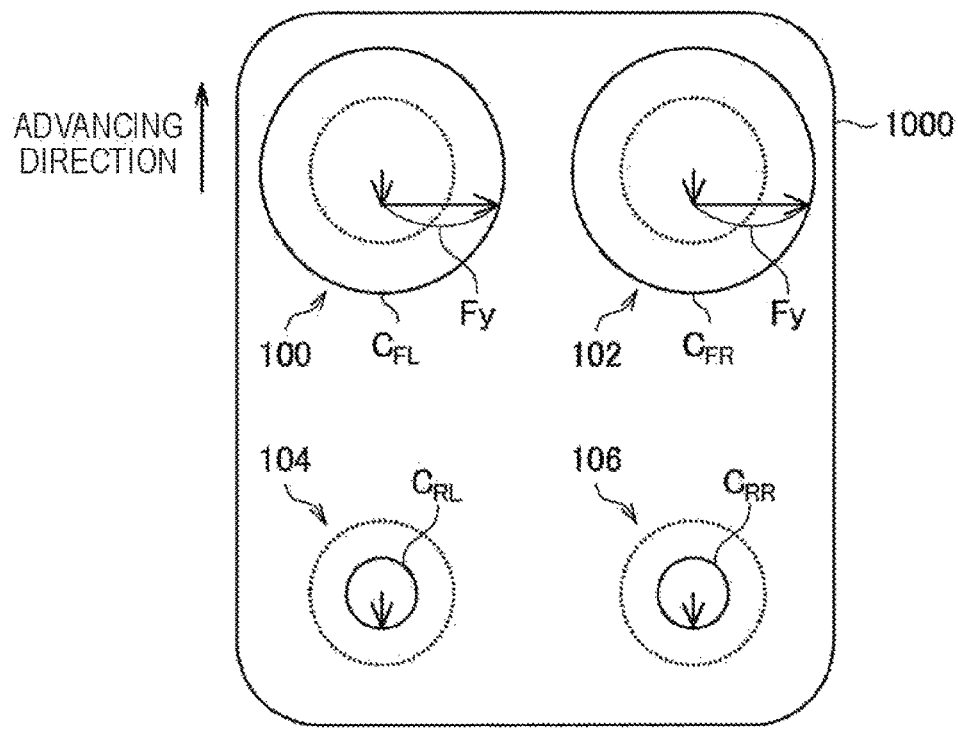
FIG. 8 is a schematic diagram for describing that the vehicle is decelerated and the more vertical loads Fz are distributed to the front wheel side, thereby changing friction circles of a front wheel and a rear wheel in size.

FIGS. 7 and 8 are schematic diagrams each of which describes that the vehicle 2000 is decelerated to distribute the more vertical loads Fz to the sides of the front wheels 100 and 102, thereby changing friction circles of the front wheels 100 and 102 and the rear wheels 104 and 106 in size. Note that FIGS. 7 and 8 each illustrate the case where it is assumed that only the front wheels 100 and 102 contribute to the lateral force Fy in the initial stage of a curve.

FIG. 7 is a schematic diagram illustrating the state in which the vehicle 2000 has not yet been decelerated. In this state, the vertical loads Fz are equally imposed on the front wheels 100 and 102 and the rear wheels 104 and 106. As illustrated in FIG. 7, the size of the friction circle of the front wheel 100 is $C_{FL}$, and the size of the friction circle of the front wheel 102 is $C_{FR}$. In addition, the size of the friction circle of the rear wheel 104 is $C_{RL}$, and the size of the friction circle of the rear wheel 106 is $C_{RR}$. In the state illustrated in FIG. 7, $C_{FL}=C_{FR}=C_{RL}=C_{RR}$ holds.

FIG. 8 is a schematic diagram illustrating the state in which the vehicle 2000 is decelerated and the vertical load is changed in step S26 of FIG. 3. Decelerating the vehicle 2000 makes the size $C_{FL}$ and the size $C_{FR}$ of friction circles of the front wheels 100 and 102 greater than those of FIG. 7. In addition, the size $C_{RL}$ and the size $C_{RR}$ of friction circles of the rear wheels 104 and 106 become smaller than those of FIG. 7. Note that FIG. 8 illustrates the size of a friction circle before deceleration as a dashed line.

As illustrated in FIG. 8, moving vertical loads to the front wheels 100 and 102 enlarges the friction circles of the front wheels 100 and 102 and shrinks the friction circles of the rear wheels 104 and 106. This makes it possible to increase the generable lateral force Fy that can be generated by the front wheels 100 and 102 with the enlargement of the friction circles, and generate the lateral force Fy necessary to make a turn at the target yaw rate.

According to the present example as described above, in the case where the target yaw rate exceeds the maximum yaw rate, it is possible to turn the vehicle 2000 within the range of the improved maximum yaw rate obtained by changing a vertical load on a wheel. In addition, in the case where the target yaw rate is less than or equal to the improved maximum yaw rate, a vertical load is controlled to allow a turn at the target yaw rate, which makes it possible to prevent a vertical load from being excessively changed.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A control apparatus for a vehicle, wherein the vehicle comprises wheels, wherein a vertical load acts on the wheels in an up-down direction of the vehicle, the control apparatus comprising:
a hub unit sensor configured to detect a value of the vertical load, wherein the value of the vertical load in a current traveling status of the vehicle is a first vertical load value;
a target yaw rate calculator configured to calculate a target yaw rate of the vehicle;
a primary limit yaw rate calculator configured to calculate a primary limit yaw rate based on a product of the first vertical load value and a current surface friction coefficient, such that the primary limit yaw rate is a yaw rate at which the vehicle can make a turn with the first vertical load value and the current surface friction coefficient, the current surface friction coefficient being a predetermined value set in the vehicle or being a value estimated by a surface friction coefficient estimator, the surface friction coefficient estimator including a camera, the surface friction coefficient estimator being configured to estimate a current surface friction coefficient of a road in the current traveling status of the vehicle on the basis of an image of the camera that images a surface of the road;

a yaw rate comparator configured to compare the target yaw rate with the primary limit yaw rate and compare the target yaw rate with a secondary limit yaw rate;

a secondary limit yaw rate calculator configured to:
 calculate a second vertical load value based on a first lateral force and the current surface friction coefficient, wherein the vertical load is allowed to generate the first lateral force on the wheels when the value of the vertical load is substantially equal to the second vertical load value, wherein the first lateral force is a maximum lateral force among lateral forces that are allowed to act on the wheels in the current traveling status of the vehicle; and
 calculate the secondary limit yaw rate based on the second vertical load value, such that the secondary limit yaw rate is a yaw rate at which the vehicle can make the turn with the second vertical load value, in a case where the target yaw rate exceeds the primary limit yaw rate; and a vertical load controller configured to adjust the value of the vertical load to be substantially equal to the second vertical load value when the target yaw rate exceeds the secondary limit yaw rate and control the vehicle to make the turn when the value of the vertical load is substantially equal to the second vertical load value.

2. The control apparatus for the vehicle according to claim 1, wherein
 the vertical load controller is further configured to adjust the value of the vertical load to be substantially equal to a third vertical load value when the target yaw rate is less than or equal to the secondary limit yaw rate and control the vehicle to make the turn when the value of the vertical load is substantially equal to the third vertical load value, and
 the third vertical load value is a value of the vertical load at which the vehicle can make the turn at the target yaw rate.

3. The control apparatus for the vehicle according to claim 2, wherein
 the vertical load controller is configured to calculate a target vertical load value from a second lateral force of the wheels corresponding to the target yaw rate.

4. The control apparatus for the vehicle according to claim 3, wherein
 the vertical load controller is configured to distribute the vertical load substantially equal to the third vertical load value on the wheels of the vehicle such that a distribution of the vertical load to front wheels of the vehicle is greater than a distribution of the vertical load to rear wheels of the vehicle.

5. The control apparatus for the vehicle according to claim 2, wherein
 the vertical load controller is configured to distribute the vertical load substantially equal to the third vertical load value on the wheels on the vehicle such that a distribution of the vertical load to front wheels of the vehicle is greater than a distribution of the vertical load to rear wheels of the vehicle.

6. The control apparatus for the vehicle according to claim 2, wherein
 the secondary limit yaw rate calculator is configured to calculate, on a basis of a relational expression that expresses a lateral force on the wheels as a quadratic function of a vertical load on the wheels.

7. The control apparatus for the vehicle according to claim 1, wherein
 the vertical load controller is configured to control a brake actuator that imparts a braking force to the vehicle or a braking and driving force generation apparatus that imparts a braking and driving force to the vehicle, thereby controlling the vehicle to make the turn based on the second vertical load.

8. The control apparatus for the vehicle according to claim 1, wherein
 the secondary limit yaw rate calculator is configured to calculate, on a basis of a relational expression that expresses a lateral force on the wheels as a quadratic function of a vertical load on the wheels.

9. The control apparatus for the vehicle according to claim 1, wherein the vertical load controller is configured to further perform regenerative control of an electric motor of the vehicle.

10. The control apparatus according to claim 1, the control apparatus further comprising
 a speed sensor configured to detect a vehicle velocity of the vehicle, and
 a memory configured to store a characteristic data, the characteristic data indicating that the vertical load has a linear relationship with a proportion of the lateral force to the vertical load, wherein
 the wheels are front wheels whose steering angle adjusted while the vehicle makes the turn,
 at least the target yaw rate calculator, the primary limit yaw rate calculator, the yaw rate comparator, the secondary limit yaw rate calculator, and the vertical load controller are provided in a processor,
 the processor is configured to repeat a processing while the vehicle makes the turn, the processing including (i) to (iv) in this order:
  (i) calculating the target yaw rate based on a curvature of the road in front of the vehicle, the curvature being recognized from an image of the camera;
  (ii) calculating the primary limit yaw rate based on the vehicle velocity, a vehicle weight of the vehicle, and the first lateral force that is the product of the first vertical load value and the current surface friction coefficient;
  (iii) calculating, when the target yaw rate exceeds the primary limit yaw rate, the second vertical load value based on the characteristic data, and calculating the secondary limit yaw rate based on the vehicle velocity, the vehicle weight of the vehicle, and the maximum lateral force that is a product of the second vertical load value and the current surface friction coefficient; and
  (iv) control, when the target yaw rate exceeds the secondary limit yaw rate, a brake actuator that imparts a braking force to the vehicle or a braking and driving force generation apparatus that imparts a braking and driving force to the vehicle to adjust the value of the vertical load to be substantially equal to the second vertical load value, and control the vehicle to make the turn when the value of the vertical load is substantially equal to the second vertical load value.

11. A control method for a vehicle, wherein the vehicle comprises wheels, wherein a vertical load acts on the wheels in an up-down direction of the vehicle, the control method comprising:
calculating a target yaw rate of the vehicle;
detecting a value of the vertical load, wherein the value of the vertical load in a current traveling status of the vehicle from a hub unit sensor is a first vertical load value;
acquiring a current surface friction coefficient of a road in the current traveling status of the vehicle;
calculating a primary limit yaw rate based on a product of the first vertical load value and the current surface friction coefficient, such that the primary limit yaw rate is a yaw rate at which the vehicle can make a turn with the first vertical load value and the current surface friction coefficient;
comparing the target yaw rate with the primary limit yaw rate;
calculating a second vertical load value based on a first lateral force and the current surface friction coefficient, wherein the second vertical load being allowed to generate the first lateral force on the wheels when the value of the vertical load is substantially equal to the second vertical load value, wherein the first lateral force being a maximum lateral force among lateral forces that are allowed to act on the wheels in the current traveling status of the vehicle;
calculating a secondary limit yaw rate based on the second vertical load value, such that the secondary limit yaw rate is a yaw rate at which the vehicle can make the turn with the second vertical load value, in a case where the target yaw rate exceeds the primary limit yaw rate;
adjusting the value of the vertical load to be substantially equal to the second vertical load value when the target yaw rate exceeds the secondary limit yaw rate; and
controlling the vehicle to make the turn when the value of the vertical load is substantially equal to the second vertical load value.

12. The control method for the vehicle according to claim 11, wherein the adjusting the value of the vertical load to be substantially equal to the second vertical load value is performed by regenerative control of an electric motor.

13. The control method for the vehicle according to claim 11, wherein the acquiring of the current surface friction coefficient of the road in the current traveling status of the vehicle includes estimating the current surface friction coefficient of the road in the current traveling status of the vehicle based on an image of a camera that images a surface of the road.

14. The control method according to claim 11, wherein the vehicle comprises
a speed sensor configured to detect a vehicle velocity of the vehicle, and
a memory configured to store a characteristic data, the characteristic data indicating that the vertical load has a linear relationship with a proportion of the lateral force to the vertical load,
the wheels are front wheels whose steering angle adjusted while the vehicle makes the turn,
the control method further comprising repeating a processing while the vehicle makes the turn, the processing including (i) to (iv) in this order:
(i) calculating the target yaw rate based on a curvature of the road in front of the vehicle, the curvature being recognized from an image of the camera;
(ii) calculating the primary limit yaw rate based on the vehicle velocity, a vehicle weight of the vehicle, and the first lateral force that is the product of the first vertical load value and the current surface friction coefficient;
(iii) calculating, when the target yaw rate exceeds the primary limit yaw rate, the second vertical load value based on the characteristic data, and calculating the secondary limit yaw rate based on the vehicle velocity, the vehicle weight of the vehicle, and the maximum lateral force that is a product of the second vertical load value and the current surface friction coefficient; and
(iv) control, when the target yaw rate exceeds the secondary limit yaw rate, a brake actuator that imparts a braking force to the vehicle or a braking and driving force generation apparatus that imparts a braking and driving force to the vehicle to adjust the value of the vertical load to be substantially equal to the second vertical load value, and control the vehicle to make the turn when the value of the vertical load is substantially equal to the second vertical load value.

15. A control apparatus for a vehicle, wherein the vehicle comprises wheels, wherein a vertical load acts on the wheels in an up-down direction of the vehicle, the control apparatus comprising:
a hub unit sensor configured to detect a value of the vertical load, wherein the value of the vertical load in a current traveling status of the vehicle is a first vertical load value;
a surface friction coefficient estimator including a camera, the surface friction coefficient estimator being configured to estimate a current surface friction coefficient of a road in the current traveling status of the vehicle on the basis of an image of the camera that images a surface of the road; and
circuitry configured to
calculate a target yaw rate of the vehicle,
calculate a primary limit yaw rate based on a product of the first vertical load value and the current surface friction coefficient, such that the primary limit yaw rate is a yaw rate at which the vehicle can make a turn with the first vertical load value and the current surface friction coefficient,
compare the target yaw rate with the primary limit yaw rate,
calculate a second vertical load value based on a first lateral force and the current surface friction coefficient, wherein the vertical load being allowed to generate a first lateral force on the wheels when the value of the vertical load is substantially equal to the second vertical load value, wherein the first lateral force being a maximum lateral force among lateral forces that are allowed to act on the wheels in the current traveling status of the vehicle,
calculate a secondary limit yaw rate based on the second vertical load value, such that the secondary limit yaw rate is a yaw rate at which the vehicle can make the turn with the second vertical load value, in a case where the target yaw rate exceeds the primary limit yaw rate,
adjust the value of the vertical load to be substantially equal to the second vertical load value when the target yaw rate exceeds the secondary limit yaw rate, and control the vehicle to make the turn when the value of the vertical load is substantially equal to the second vertical load value.

16. The control apparatus for the vehicle according to claim 15, wherein the circuitry is configured to adjust the value of the vertical load to be substantially equal to the second vertical load value by performing regenerative control of an electric motor.

17. The control apparatus according to claim 15, the control apparatus further comprising:
   a speed sensor configured to detect a vehicle velocity of the vehicle, and
   a memory configured to store a characteristic data, the characteristic data indicating that the vertical load has a linear relationship with a proportion of the lateral force to the vertical load, wherein
the wheels are front wheels whose steering angle adjusted while the vehicle makes the turn,
   the circuitry is configured to repeat a processing while the vehicle makes the turn, the processing including (i) to (iv) in this order:
      (i) calculating the target yaw rate based on a curvature of the road in front of the vehicle, the curvature being recognized from an image of the camera;
      (ii) calculating the primary limit yaw rate based on the vehicle velocity, a vehicle weight of the vehicle, and the first lateral force that is the product of the first vertical load value and the current surface friction coefficient;
      (iii) calculating, when the target yaw rate exceeds the primary limit yaw rate, the second vertical load value based on the characteristic data, and calculating the secondary limit yaw rate based on the vehicle velocity, the vehicle weight of the vehicle, and the maximum lateral force that is a product of the second vertical load value and the current surface friction coefficient; and
      (iv) control, when the target yaw rate exceeds the secondary limit yaw rate, a brake actuator that imparts a braking force to the vehicle or a braking and driving force generation apparatus that imparts a braking and driving force to the vehicle to adjust the value of the vertical load to be substantially equal to the second vertical load value, and control the vehicle to make the turn when the value of the vertical load is substantially equal to the second vertical load value.

* * * * *